United States Patent [19]

Masaki

[11] Patent Number: 5,962,125
[45] Date of Patent: *Oct. 5, 1999

[54] MAGNETIC RECORDING MEDIUM

[75] Inventor: Kouichi Masaki, Kanagawa, Japan

[73] Assignee: Fuji Photo Film Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/802,251

[22] Filed: Feb. 19, 1997

[30] Foreign Application Priority Data

Feb. 23, 1996 [JP] Japan ..................... 8-036631

[51] Int. Cl.$^6$ ............................................. G11B 5/68
[52] U.S. Cl. .................... 428/328; 428/329; 428/403; 428/405; 428/694 BS; 428/694 BM; 428/694 BA; 428/900
[58] Field of Search .................... 428/328, 329, 428/694 BS, 694 BM, 403, 405, 900, 694 BA

[56] References Cited

U.S. PATENT DOCUMENTS

| | | | |
|---|---|---|---|
| 5,219,670 | 6/1993 | Ohno et al. | 428/694 B |
| 5,496,622 | 3/1996 | Isobe et al. | 428/216 |
| 5,560,983 | 10/1996 | Ishida et al. | 428/216 |
| 5,587,232 | 12/1996 | Hayashi et al. | 428/323 |
| 5,670,245 | 9/1997 | Isobe et al. | 428/216 |

*Primary Examiner*—Stevan A. Resan
*Attorney, Agent, or Firm*—Brinks Hofer Gilson & Lione

[57] ABSTRACT

A magnetic recording medium is disclosed, comprising a non-magnetic support having thereon at least one magnetic layer comprising a binder and a ferromagnetic metal powder mainly composed of iron, wherein the amount of a complex of iron with benzohydroxamic acid formed in the magnetic recording medium is from 0 to 6.0 ppm/g. Also, a magnetic recording medium is disclosed, which comprises a non-magnetic support having thereon at least two layers comprising a non-magnetic layer comprising a non-magnetic powder and a binder provided on a non-magnetic support and a magnetic layer comprising a binder and a ferromagnetic metal powder mainly composed of iron provided on said non-magnetic layer, wherein said non-magnetic powder contained in said non-magnetic layer forms a complex of iron with benzohydroxamic acid in an amount of from 0 to 10 ppm/g and has a water-soluble sodium salt content of from 0 to 150 ppm/g and a total water-soluble alkaline earth metal salt content of from 0 to 50 ppm/g.

The present invention provides a magnetic recording medium excellent in practical performance such as running properties, durability and storage properties.

17 Claims, No Drawings

MAGNETIC RECORDING MEDIUM

FIELD OF THE INVENTION

The present invention relates to a magnetic recording medium such as a magnetic tape. More particularly, the present invention relates to a coating type magnetic recording medium obtained by a process which comprises coating a magnetic coating solution mainly comprising a ferromagnetic powder and a binder to a non-magnetic support to form a magnetic layer thereon. The present invention further relates to such the magnetic recording medium which exhibits stable running properties in various atmospheres.

BACKGROUND OF THE INVENTION

Because of its excellent advantages which cannot be seen in other recording systems, that is, it enables repeated use of media, it can easily convert a signal into an electronic signal, enabling the configuration of a system combined with peripheral equipment, and it can rewrite a signal, magnetic recording technique has been widely utilized in various fields such as video equipment, audio equipment and computers.

In order to cope with the tendency toward miniaturization of equipment, the demand for improvement in the quality of recorded and reproduced signals, the demand for prolongation of recording time and the demand for increase in the recording capacity, it has been desired to further improve the recording density, reliability and durability of recording media.

In audio and video applications, in order to cope with the development of a digital recording system realizing improved sound quality and picture quality in practical use and the development of a video recording system adapted for high definition TV, magnetic recording media enabling the recording and reproduction of short wave signals and having an excellent reliability and durability against the increase in the speed of the head relative to the medium have been required more so than in the conventional systems.

Also, in computer applications, improvement digital recording media having a large capacity have been demanded to store increased data.

In order to allow the coating type magnetic recording medium for performing high density recording, various methods have been studied. For example, it has been proposed to use an iron powder or a magnetic alloy powder mainly composed of iron instead of magnetic iron oxide powder which has heretofore been used, to improve the magnetic properties of the magnetic layer by improving the fineness, packing and orientability of magnetic powder, to enhance the dispersibility of ferromagnetic powder, or to improve the surface properties of the magnetic layer.

For example, a method which comprises incorporating a ferromagnetic metal powder or hexagonal ferrite powder as a ferromagnetic powder to improve the magnetic properties thereof is disclosed in JP-A-58-122623 (The term "JP-A" as used herein means an "unexamined published Japanese patent application"), JP-A-61-74137, JP-B-62-49656 (The term "JP-B" as used herein means an "examined Japanese patent publication"), JP-B-60-50323, U.S. Pat. Nos. 4,629,653, 4,666,770, and 4,543,198.

In order to enhance the dispersibility of a ferromagnetic powder, the use of various surface active agents is proposed in JP-A-52-156606, JP-A-53-15803, and JP-A-53-116114. Further, the use of various reactive coupling agents is proposed in JP-A-49-59608, JP-A-56-58135, and JP-B-62-28489.

Further, in order to improve the surface properties of a magnetic layer, the improvement in the method for forming and surface-treating a magnetic layer which has been applied and dried is proposed in JP-B-60-44725.

As the miniaturization of apparatus, the improvement of quality of recorded and reproduced signal, the prolongation of recording time and the increase in the recording capacity have been realized, the environment in which magnetic recording media are used has been widened more and more. Therefore, when used and stored in various environments, these magnetic recording media need to exhibit the same stable running properties as in ordinary environment. A magnetic recording medium comprising a plurality of layers (i.e., a non-magnetic layer mainly composed of a non-magnetic powder and a binder provided on a non-magnetic support and a magnetic layer mainly composed of a ferromagnetic metal powder and a binder provided on the non-magnetic layer) basically has a small self-demagnetization and has a smooth surface (roughness) and thus provides a high performance magnetic recording medium which can operate with a small spacing loss. However, it was found that when allowed to run after stored under high temperature and humidity conditions, the foregoing magnetic recording medium exhibits a raised friction coefficient and, in some extreme cases, causes sticking so that running is stopped, depending on the surface properties and impurity content of the ferromagnetic metal powder incorporated in the upper layer and the non-magnetic powder incorporated in the lower layer.

SUMMARY OF THE INVENTION

An object of the present invention is to provide a magnetic recording medium having a magnetic layer provided on a non-magnetic support that is excellent in practical performance such as running properties, durability and storage properties.

The foregoing object of the present invention will become more apparent from the following detailed description and examples.

The present invention has the following constitutions:

1. A magnetic recording medium comprising a non-magnetic support having thereon at least one magnetic layer comprising a binder and a ferromagnetic metal powder mainly composed of iron, wherein the amount of a complex of iron with benzohydroxamic acid formed in the magnetic recording medium is from 0 to 6.0 ppm/g.

Further, the preferred embodiments of the above invention are shown below.

2. The magnetic recording medium according to the above item 1, wherein the ferromagnetic metal powder contained in the magnetic layer forms a complex of iron with benzohydroxamic acid in an amount of from 0 to 10 ppm/g.

3. The magnetic recording medium according to the above item 1, wherein the ferromagnetic metal powder contained in the magnetic layer has a water-soluble sodium salt content of from 0 to 100 ppm/g and a total water-soluble alkaline earth metal salt of from 0 to 50 ppm/g.

4. The magnetic recording medium according to the above item 1, wherein the ferromagnetic metal powder contained in the magnetic layer is a ferromagnetic metal powder containing cobalt.

5. The magnetic recording medium according to the above item 1, wherein the ferromagnetic metal powder contained in the magnetic layer comprises at least aluminum as a sintering inhibitor.

Further, the present invention has the following constitutions:

6. A magnetic recording medium which comprises a non-magnetic support having thereon at least two layers comprising a non-magnetic layer comprising a non-magnetic powder and a binder provided on a non-magnetic support and a magnetic layer comprising a binder and a ferromagnetic metal powder mainly composed of iron provided on the non-magnetic layer, wherein the non-magnetic powder contained in the non-magnetic layer forms a complex of iron with benzohydroxamic acid in an amount of from 0 to 10 ppm/g and has a water-soluble sodium salt content of from 0 to 150 ppm/g and a total water-soluble alkaline earth metal salt content of from 0 to 50 ppm/g.

Further, the preferred embodiment of the above invention is shown below.

7. The magnetic recording medium according to the above item 6, wherein the non-magnetic powder contained in the non-magnetic layer is an acicular $\alpha$-$Fe_2O_3$.

The inventors directed their attention to the surface properties and impurity content of the ferromagnetic metal powder to be incorporated in the magnetic layer and the non-magnetic powder to be incorporated in the lower layer in the arrangement so that two or more coating layers are provided on a non-magnetic support. The inventors then made extensive studies of the preparation of a magnetic recording medium excellent in practical performance such as running properties, durability and storage properties by changing the combination of the two factors. A magnetic tape was stored at a temperature of 60° C. and a relative humidity of 90% for 1 week so that substances present on the surface of the tape were gathered for analysis. As a result, fatty acid iron was detected besides lubricant. As a model, fatty acid iron was applied to a guide pole. The friction coefficient of the guide pole was then measured. As a result, the guide pole exhibited a remarkably raised friction coefficient. In other words, the measure singly comprising the reduction of water-soluble sodium salts and alkaline earth salts contained in the magnetic powders and the non-magnetic powder which have been heretofore noticed and considered for improvement leaves something to be desired in the improvement of storage properties. It was thus found that the content of iron ion which reacts with fatty acid in the magnetic layer needs to be reduced. It is thought that various elements constituting the ferromagnetic metal powder need to be noticed. However, iron ion, which is a main component, was noticed first of all. In other words, the relationship between the amount of iron ion which reacts with fatty acid in the ferronmagnetic metal powder and the non-magnetic powder for lower layer and the storage properties of the magnetic recording medium was noticed. It was thus found that the storage properties of the magnetic recording medium can be improved by predetermining the content of iron ion to not more than a specified value. The present invention has been thus worked out.

The inventors made a study of a method of quantitatively evaluating the amount of iron ion which reacts with fatty acid in the ferromagnetic metal powder and the non-magnetic powder for lower layer. As a result, it was found that iron ion forms a complex with benzohydroxamic acid (hereinafter simply referred to as "iron complex") to give absorption in the vicinity of 440 nm. The calibration curve of the amount of iron complex vs. absorbance was prepared. On the calibration curve, the amount of iron ion can be determined from the amount of iron complex produced. The amount of iron ion is called the produced amount of iron complex.

The method of measuring the produced amount of iron complex in the present invention will be described hereinafter.

(1) Produced amount of iron complex in the magnetic recording medium (corresponding to Claim 1)

A magnetic recording medium prepared (7.94 m long when it is a 8-mm tape; 5.0 m long when it is a ½ inch tape) is dipped in 50 ml of a 0.05 mol/l (hereinafter M) ethanol solution of purified benzohydroxamic acid which is then kept at a temperature of 25° C. for 20 hours. The solution is then filtered. The filtrate is then measured for absorbance. From the calibration curve thus prepared, the amount of iron complex produced of magnetic recording medium corresponding to 1 g of ferromagnetic metal powder (ppm/g (=concentration of iron ion in iron complex by weight)) is then calculated. In the case where the magnetic recording medium is composed of a magnetic layer and a non-magnetic layer, the produced amount of iron complex in the magnetic recording medium includes the contribution of the non-magnetic layer to the produced amount of iron complex.

(2) Produced amount of iron complex in ferromagnetic metal powder contained in magnetic layer (corresponding to Claim 2)

2 g of a ferromagnetic metal powder as a starting material is dipped in 50 ml of a 0.05 M ethanol solution of purified benzohydroxamic acid which is then kept at a temperature of 25° C. for 20 hours. The solution is then filtered. The filtrate is then measured for absorbance. From the calibration curve thus prepared, the amount of iron complex produced per g of ferromagnetic metal powder (ppm/g (=concentration of iron ion in iron complex by weight)) is calculated.

(3) Produced amount of iron complex in non-magnetic powder contained in non-magnetic layer (corresponding to Claim 10)

This measurement process is the same as the foregoing measurement method (2) except that a non-magnetic powder is used as a starting material.

In the case of ferromagnetic metal powder, it was confirmed that the produced amount of iron complex is raised by raising the reaction temperature or by prolonging the reaction time. In the present invention, the reaction is examined or performed at a temperature of 25° C. for 20 hours for the measurement of produced amount of iron complex.

The term "storage properties" as used herein is meant to indicate the change in friction coefficient between before and after the storage of the magnetic tape at a temperature of 60° C. and a relative humidity of 90% for 1 week. When the change in friction coefficient is small, it means that the storage properties are good. When the friction coefficient shows a drastic change or sticking occurs, it means that the storage properties are bad.

In connection with storage properties, an even more desirable range of produced amount of iron complex was studied. As a result, it was found that the storage properties can be improved by controlling the amount of iron complex produced of magnetic recording medium corresponding to 1 g of ferromagnetic metal powder to a range of from 0 to 6 ppm/g, preferably from 0 to 5.0 ppm/g, more preferably from 0 to 4.0 ppm/g or by controlling the amount of iron complex produced in ferromagnetic metal powder or non-magnetic powder as a starting material to a range of from 0 to 10 ppm/g, preferably from 0 to 8.5 ppm/g, more preferably from 0 to 6.0 ppm/g.

Further, as the ferromagnetic metal powder there can be used one having a water-soluble sodium salt content of from 0 to 100 ppm/g, preferably from 0 to 60 ppm/g, and a total water-soluble alkaline earth metal salt of from 0 to 50 ppm, preferably from 0 to 40 ppm/g to inhibit the production of fatty acid salt, making it possible to provide a magnetic recording medium which shows no deterioration of electromagnetic characteristics such as output and C/N and exhibits excellent storage properties.

On the other hand, in connection with storage properties, the non-magnetic powder contained in the non-magnetic layer was studied. As a result, it was found that substances free of iron have a small content of water-soluble alkaline metal (mainly sodium) salts or water-soluble alkaline earth metal salts. When the non-magnetic powder, particularly non-magnetic iron compound powder, to be incorporated in the lower layer has a water-soluble sodium salt content of from 0 to 150 ppm/g, preferably from 0 to 100 ppm/g and a total water-soluble alkaline earth metal salt content of from 0 to 50 ppm/g, preferably from 0 to 40 ppm/g, and produces an iron complex in an amount of from 0 to 10 ppm/g, preferably from 0 to 6.0 ppm/g, a magnetic recording medium comprising an upper layer made of a ferromagnetic metal powder having a small water-soluble impurity content and a small content of iron ion which forms an iron complex with benzohydroxamic acid is excellent particularly in storage properties among the practical performances such as running properties, durability and storage properties.

In the present invention, the method of controlling the amount of iron complex produced by the magnetic recording medium, ferromagnetic metal powder or non-magnetic powder to the range defined herein is not specifically limited. Any proper method may be employed.

The inventors studied various factors to reduce the produced amount of iron complex. As a result, it was preferred that the metal composition of the ferromagnetic metal powder be an iron-cobalt alloy rather than iron alone and the sintering inhibitor comprise at least aluminum. It was then found that the more the aluminum content is, the less is the produced amount of iron complex. It was also found that the combined use of aluminum and yttrium, too, exerts an effect of reducing the produced amount of iron complex.

In order to control the amount of an iron complex produced by a non-magnetic powder, particularly iron compound powder such as $\alpha\text{-}Fe_2O_3$ to a range of from 0 to 10 ppm/g, it is effective to thoroughly wash $\alpha\text{-}Fe_2O_3$ obtained with water so that sulfate ions, phosphate ions, etc. can be removed. $\alpha\text{-}Fe_2O_3$ is preferably washed with an alkali to remove sulfate ions, phosphate ions, etc. from the surface thereof. $\alpha\text{-}Fe_2O_3$ is then washed with water to change the pH condition thereof from neutrality to alkalinity. It was also confirmed that the surface treatment of $\alpha\text{-}Fe_2O_3$ with an aluminum compound and/or silicon compound, too, exerts an effect of reducing the produced amount of iron complex. The surface treatment of $\alpha\text{-}Fe_2O_3$ with an aluminum compound and/or silicon compound is preferably accompanied by the changing the pH condition of $\alpha\text{-}Fe_2O_3$ from neutrality to alkalinity. The surface treatment with an aluminum compound and/or silicon compound controls the basicity point, making it possible to improve the dispersibility of $\alpha\text{-}Fe_2O_3$ in a resin as well as control the adsorbed amount of fatty acid and eventually determine the amount of free fatty acid on the surface of the magnetic recording medium.

Also, it is effective for reducing the produced amount of iron complex to use an Al solid solution hematite which is produced by dehydrating an Al solid solution goethite in which Al is added upon the goethite reaction.

Further, it is preferred that the Al solid solution hematite is surface-treated with an Al compound and/or a Si compound when Al is doped, the hematite may be surface-treated with the Al compound and then heat-treated to diffuse Al into the particle.

It is unknown the reason why the produced amount of iron complex is reduced when the pH condition of $\alpha\text{-}Fe_2O_3$ is on the alkalinity side. It may be thought that when the pH value increases, the solubility of $Fe(OH)_3$ decreases to reduce the produced amount of iron complex. Further, alkaline earth metal salts can be hardly eluted with water when pH is high. Therefore, the adjustment of the pH value of $\alpha\text{-}Fe_2O_3$ within the above defined range is desirable in this respect, too. The pH value of $\alpha\text{-}Fe_2O_3$ is preferably from 6.0 to 10, more preferably from 6.5 to 9.5 as determined by JIS-A method.

In other words, in accordance with the present invention, the produced amount of iron complex in the magnetic recording medium is restricted to a range of from 0 to 6.0 ppm/g. Alternatively, the amount of iron complexes produced by the ferromagnetic metal powder incorporated in the upper layer and the non-magnetic powder incorporated in the lower layer is restricted to a range of from 0 to 10 ppm/g. Further, the water-soluble sodium salt content and the water-soluble alkaline earth metal salt content of the magnetic recording medium is predetermined to not more than a specified value. In this arrangement, the deposition of fatty acid iron, calcium compound of fatty acid, magnesium compound of fatty acid, sodium compound of fatty acid, etc. can be inhibited. Thus, electromagnetic characteristics such as output and C/N can remain undeteriorated. Further, excellent storage properties and a low friction coefficient can be obtained.

For the measurement of the water-soluble sodium salt content and the water-soluble alkaline earth metal salt content of the ferromagnetic metal powder or non-magnetic powder, 5 g of the ferromagnetic metal powder or non-magnetic powder is put in 100 ml of distilled water. The mixture is then stirred for 1 hour to effect extraction. The resulting liquid is then filtered. The filtrate is then measured for the water-soluble sodium salt content by atomic-absorption spectroscopy and the water-soluble alkaline earth metal salt content by ICP (Inductivity coupled plasma atomic emission spectrometer). These values are represented by ppm/g (concentration per g of ferromagnetic metal powder or non-magnetic powder).

In the case of a multiple layer structure, it is an essential requirement that the lower layer have a small surface roughness. Therefore, the non-magnetic powder to be used inevitably comprises finely particles. Among non-magnetic powders, inorganic particles possibly show an increased surface catalyst activity as their diameter is reduced. As a countermeasure against this problem with, e.g., a titanium oxide fine particle there is known a method which comprises solidly dissolving trivalent ions such as Al ion and Fe ion in the titanium oxide fine particle, and then subjecting the material to surface treatment with alumina, silica-alumina or the like to reduce the photocatalyst activity. It is proposed in JP-A-6-60362 that an acicular $\alpha\text{-}Fe_2O_3$ be subjected to surface treatment with an aluminum compound, aluminum-silicon compound, aluminum-phosphorus compound, aluminum-titanium compound, aluminum-nickel compound, aluminum-zinc compound or the like.

The pH value of the non-magnetic powder varies with the composition, trace amount of impurities and surface treatment conditions (kind, processed amount, etc.) of the non-magnetic powder. In some detail, the non-magnetic powder is heated (to a temperature of from 60° C. to 200° C., for example) or subjected to surface treatment with an inorganic substance in the form of alkaline suspension. The two treatments may be effected in combination to control the pH value of the non-magnetic powder to a range of from 6 to 10. It is known that the amount of a free lubricant on the surface of the magnetic tape needs to be controlled so that the lubricant is present thereon in a proper amount from the standpoint of running properties. In order to improve the storage properties, it is advantageous that the produced amount of iron complex is small and the pH value of the non-magnetic powder is high. However, if the pH value of the non-magnetic powder is too high, the amount of fatty acid adsorbed by the non-magnetic powder is increased, the free fatty acid is decreased. This raises the friction coefficient, deteriorating the running properties of the magnetic recording medium. When the non-magnetic powder is treated with an organic material containing an acidic functional group having a higher adsorptivity than fatty acid before dispersion to increase the amount of free fatty acid, thereby controlling the friction coefficient, the resulting magnetic recording medium exhibits a reduced friction coefficient and good storage properties. As the organic material containing a functional group having a higher adsorptivity than fatty acid there may be preferably used an organic phosphoric acid compound, organic phosphonic acid compound, organic sulfonic acid compound, organic hydroxamic acid compound or the like. Such an organic material is normally used in an amount of from 0.5 to 6.0 parts by weight, preferably from 1.0 to 5.0 parts by weight based on 100 parts by weight of the non-magnetic powder.

These non-magnetic powders may be used singly or in combination so far as they produce an iron complex in the above defined range and exhibit the above defined pH range. The particle size of these non-magnetic powders is preferably from 0.01 to 2 $\mu$m. If necessary, non-magnetic powders having different particle sizes may be combined, or a single non-magnetic powder having a wider particle size distribution may be used to exert similar effects. In order to enhance the interaction of the non-magnetic powder with the binder resin used and hence improve the dispersibility of the non-magnetic powder, the non-magnetic powder to be used may be subjected to surface treatment. Examples of the surface treatment employable herein include inorganic materials such as aluminum compound, silicon compound, silica, alumina and silica-alumina, and coupling agents such as silane coupling agent having a functional group at terminal and titanium coupling agent. The non-magnetic powder preferably has a tap density of from 0.3 to 1.5 g/ml, a water content of from 0.2 to 5% by weight and a specific surface area of from 5 to 100 m$^2$/g. The foregoing non-magnetic powder may be acicular, spherical, cubic or tabular. The material of the non-magnetic powder to be used herein is not specifically limited. Any known material may be used. Specific examples of such a non-magnetic powder material include inorganic compounds such as $\alpha$-Fe$_2$O$_3$ and titanium dioxide, and organic solid compounds.

The composition of the ferromagnetic metal powder mainly composed of iron to be incorporated in the magnetic layer of the present invention is not specifically limited so far as the above defined produced amount of iron complex, preferably water-soluble sodium salt content and water-soluble alkaline earth metal salt content are satisfied. In the present invention, ferromagnetic metal powder compositions which are commonly used for high density recording medium are desirable. The iron content of the ferromagnetic metal powder is not less than 55 atomic percent, preferably from 60 to 95 atomic percent of the ferromagnetic metal powder. Preferred examples of the elements to be used in combination with iron include nickel, and cobalt. Particularly preferably, cobalt is used in combination with iron.

Among these elements, cobalt contributes to the control over the produced amount of iron complex. Cobalt also can help form a tight and thin oxide film having a high $\sigma$s. Thus, cobalt is particularly desirable in the present invention. The cobalt content is preferably from 5 to 50 atomic percent, more preferably from 10 to 45 atomic percent, most preferably from 15 to 45 atomic percent based on iron atom. Nickel is normally used in an amount of from 0 to 10 atomic percent. Nickel has an effect of accelerating reduction. In accordance with a known method, the starting material of the ferromagnetic metal powder is doped with cobalt in some part of the required amount. The balance of the required amount of cobalt is then applied to the surface of the starting material. The mixture is then alloyed by reduction.

The foregoing ferromagnetic metal powder used herein may contain aluminum and an atom such as Si, S, Ti, V, Cr, Cu, Y, Mo, Rh, Pd, Ag, Sn, Sb, Te, Ba, Sr, W, Au, Pb, Bi, La, Ce, Pr, Nd, Sm, P, Mn, Zn, B, Ca and Mg in a total amount of not more than 20 atomic percent, preferably from 7 to 20 atomic percent based on iron atom. In the present invention, aluminum may be used in an amount of from 5 to 20 atomic percent, preferably from 6 to 15 atomic percent based on iron. The more the aluminum content is, the higher is the effect of reducing the amount of iron complex. The combined use of aluminum and yttrium, too, has a good similar effect. Yttrium is used in an amount of from 2 to 10 atomic percent, preferably from 4 to 9 atomic percent based on iron. These elements has an effect of controlling the shape of the starting material as well as inhibiting the sintering of particle to particle, accelerating the reduction of particles and controlling the shape of the ferromagnetic metal powder thus reduced and the surface roughness of the particles. In particular, aluminum is preferably contained as at least a sintering inhibitor.

The method of obtaining a ferromagnetic metal powder or non-magnetic powder having a water-soluble sodium salt content of from 0 to 150 ppm/g and a total water-soluble alkaline earth metal salt content of from 0 to 50 ppm/g is not specifically limited. Basically, a starting material free of or having a small content of these elements may be selected. Alternatively, a step of properly removing these elements mixed in the various reaction systems by washing or like method may be provided in the procedure of preparing the non-magnetic powder and ferromagnetic metal powder. Alternatively, a reaction system may be employed such that these elements are not produced.

For example, a process for the preparation of goethite may be selected. Alternatively, ion exchange may be used to replace sodium salts contained in the various production reaction systems by calcium salts, followed by washing with distilled water, so that the calcium salts are removed as well. Eventually, the content of both calcium and sodium salts can be reduced. Alternatively, goethite may be dehydrated to $\alpha$-Fe$_2$O$_3$ which is then washed with water. In this case, too, the foregoing ion exchange may be employed. The ferromagnetic metal powder to be used in the present invention may be obtained by subjecting such an $\alpha$-Fe$_2$O$_3$ to proper sintering inhibition treatment, followed by reduction.

As well known, a ferromagnetic metal powder is normally subjected to the formation of an oxide film on the surface of particles by a gradual oxidation treatment to obtain a chemical stability. The ferromagnetic metal powder may contain a small amount of hydroxides or oxides. Carbon dioxide gas may be contained in the gas used at the gradual oxidation treatment because such carbon dioxide gas, if any, is adsorbed at the basicity point the surface of the ferromagnetic metal powder.

In order to reduce the surface roughness of the magnetic recording medium, particularly in the form of magnetic tape, it is preferred that the long axis length of the ferromagnetic metal powder is from 0.04 to 0.15 μm, particularly from 0.05 to 0.12 μm and the acicular ratio of the ferromagnetic metal powder is from 4 to 10, particularly from 4 to 8. Assuming that the ratio of particles formed by single crystal to all particles is percent crystallization, the percent crystallization is preferably from 30% to 100%, more preferably from 35% to 100% when the crystal in the ferromagnetic metal particles is observed.

The saturation magnetization of the ferromagnetic metal powder of the present invention is preferably not less than 125 emu/g, more preferably from 130 to 160 emu/g. The ferromagnetic metal powder which has just been reduced can be effectively treated with a compound as disclosed in JP-A-61-52327 and JP-A-7-94310 or a coupling agent having various substituents, followed by gradual oxidation, to enhance the saturation magnetization thereof. The coercive force of the ferromagnetic metal powder is preferably from 1,800 to 3,000 Oe (oersted), more preferably from 1,900 to 2,800 Oe.

The ferromagnetic metal powder may be treated with a treatment as described later, e.g., dispersant, lubricant, surface active agent, antistatic agent before dispersion. For the detail of this treatment, reference can be made to JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639, U.S. Pat. Nos. 3,026,215, 3,031,341, 3,100,194, 3,242,005 and 3,389,014.

The water content of the ferromagnetic metal powder is preferably from 0.01 to 2% by weight. The water content of the ferromagnetic metal powder is preferably optimized depending on the kind of the binder described later.

The tap density of the ferromagnetic metal powder is preferably from 0.2 to 0.8 g/ml. If the tap density exceeds 0.8 g/ml, the ferromagnetic metal powder cannot be uniformly subjected to gradual oxidation, making it difficult to safely handle or causing a drop in the magnetization of the resulting tape with time. On the contrary, if the tap density falls below 0.2 g/ml, it tends to provide an insufficient dispersion.

As the binder resin to be incorporated in the magnetic layer of the magnetic recording medium of the present invention there may be used a known thermoplastic resin, thermosetting resin or reactive resin, singly or in admixture.

As the thermoplastic resin there may be used one having a glass transition temperature of from −100° C. to 150° C., a number-average molecular weight of from 1,000 to 200,000, preferably from 10,000 to 100,000, and a polymerization degree of from about 50 to about 1000. Examples of such binder resins include polymers or copolymers containing as constituent units vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal, vinyl ether, etc., polyurethane resins, and various rubber resins.

Examples of the above mentioned thermosetting resins or reactive resins include phenol resin, epoxy resin, polyurethane hardening resin, urea resin, melamine resin, alkyd resin, acrylic reactive resin, formaldehyde resin, silicone resin, epoxy-polyamide resin, mixture of polyester resin and isocyanate prepolymer, mixture of polyester polyol and polyisocyanate, and mixture of polyurethane and polyisocyanate.

If necessary, at least one polar group selected from the group consisting of COOM, $SO_3M$, $OSO_3M$, $P=O(OM)_2$, $O-P=(OM)_2$ (in which M is a hydrogen atom or alkaline metal base), OH, $NR_2$, $N^+R_3$ (in which R is a hydrocarbon group), epoxy group, SH and CN is preferably introduced into the foregoing binder resin by copolymerization or addition reaction to obtain a better effect of dispersing ferromagnetic metal powder and a higher durability of the magnetic layer. The amount of such the polar group is in the range of generally $1\times10^{-1}$ to $1\times10^{-8}$ mol/g, preferably $1\times10^{-2}$ to $1\times10^{-6}$ mol/g.

The binder resin to be incorporated in the magnetic recording medium of the present invention is used in an amount of from 5 to 50% by weight, preferably from 10 to 30% by weight based on the weight of the ferromagnetic metal powder. If a vinyl chloride resin is to be used, its content is preferably in the range of 5 to 100% by weight If a polyurethane resin is to be used, its content is preferably in the range of 2 to 50% by weight. If a polyisocyanate is to be used, its content is preferably in the range of 2 to 100% by weight. These binder resins are preferably used in these amounts in combination.

The packing density of the ferromagnetic metal powder in the magnetic can be calculated as (Bm/4πσs) from the maximum saturation magnetization (σs) and the maximum magnetic flux density (Bm) of the ferromagnetic metal powder used. In the present invention, the packing density of the ferromagnetic metal powder is preferably not less than 1.7 g/ml, more preferably not less than 1.9 g/ml, most preferably not less than 2.1 g/ml.

In the present invention, if a polyurethane is used, its glass transition temperature, breaking extension, breaking stress and yield point are preferably in the range of −50° C. to 100° C., 100 to 2,000%, 0.05 to 10 kg/cm$^2$ and 0.05 to 10 kg/cm$^2$, respectively.

Examples of polyisocyanates which can be used in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, products of the reaction of these isocyanates with polyalcohols, and polyisocyanates produced by the condensation of isocyanates. Examples of the trade names of these commercially available isocyanates include Coronate L, Coronate HL, Coronate 2030, Coronate 2031, Millionate MR and Millionate MTL (produced by Nippon Polyurethane Co., Ltd.), Takenate D-102, Takenate D-110N, Takenate D-200 and Takenate D-202 (produced by Takeda Chemical Industries, Ltd.), and Desmodur L, Desmodur IL, Desmodur N and Desmodur HL (produced by Sumitomo Bayer Co., Ltd.). These isocyanates may be used singly. Alternatively, by making the best use of the difference in hardening reactivity, two or more of these isocyanates can be used in combination.

The magnetic layer of the magnetic recording medium of the present invention may normally comprise various functional materials such as lubricant, abrasive, dispersant, antistatic agent, plasticizer and mildewproofing agent incorporated therein depending on the purpose.

Examples of the lubricant which can be incorporated in the magnetic layer of the present invention include silicone oils such as dialkyl polysiloxane (containing $C_{1-5}$ alkyl), dialkoxy polysiloxane (containing $C_{1-4}$ alkoxy), monoalkyl monoalkoxy polysiloxane (containing $C_{1-5}$ alkyl and $C_{1-4}$ alkoxy), phenyl polysiloxane and fluoroalkyl polysiloxane (containing $C_{1-5}$ alkyl); finely divided powder of electrically conductive material such as graphite; powder of inorganic material such as molybdenum disulfide, tungsten disulfide, boron nitride and graphite fluoride; finely divided powder of plastic such as polyethylene, polypropylene, ethylene- vinyl chloride copolymer and polytetrafluoroethylene; α-olefin polymer; fatty acid such as saturated fatty acid which normally stays solid (having from 10 to 22 carbon atoms); unsaturated aliphatic hydrocarbons which are normally liquid (compound having n-olefin double bond connected to terminal carbon; number of carbon atoms: about 20); aliphatic acid esters made of $C_{12-20}$ monobasic aliphatic acid and $C_{3-12}$ monovalent alcohol; polyglycol; alkylphosphoric acid ester; fluoroalcohol; and fluorocarbons.

Preferred among these lubricants are saturated fatty acid and aliphatic acid ester. The two compounds are preferably used in combination. Examples of the alcohol to be used as a starting material of aliphatic ester include monovalent alcohols such as ethanol, butanol, phenol, benzyl alcohol, 2-methyl butyl alcohol, 2-hexyldecyl alcohol, propylene glycol monobutyl ether, ethylene glycol monobutyl ether, dipropylene glycol monobutyl ether, diethylene glycol monobutyl ether and sec-butyl alcohol; and polyvalent alcohols such as ethylene glycol, diethylene glycol, neopentyl glycol, glycerin and sorbitan derivative. Examples of the aliphatic acid to be used as a starting material of aliphatic acid ester include aliphatic carboxylic acids such as acetic acid, propionic acid, octanoic acid, 2-ethylhexanoic acid, lauric acid, myristic acid, stearic acid, palmitic acid, behenic acid, arachic acid, oleic acid, linoleic acid, linolenic acid, elaidic acid and palmitoleic acid, and mixture thereof.

Specific examples of aliphatic acid esters include various ester compounds such as butyl stearate, sec-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, mixture of butyl stearate and butyl palmitate, butoxyethyl stearate, 2-butoxy-1-propyl stearate, compound obtained by esterification of dipropylene glycol monobutyl ether with stearic acid, diethylene glycol dipalmitate, diol obtained by acylation of hexamethylenediol with myristic acid, and oleate of glycerin.

In order to reduce the hydrolysis of aliphatic acid esters which often occurs when magnetic recording media are used under high humidity, the isomerism (cis/trans) and branch position (branch/straight chain) of aliphatic acids and alcohols as starting materials may be properly selected.

Such lubricant may be added in an amount of from 0.2 to 20 parts by weight based on 100 parts by weight of the binder. In particular, the fatty acid is used in an amount of generally from 0.1 to 2.0 parts by weight, preferably from 0.3 to 1.5 parts by weight based on 100 parts by weight of the ferromagnetic metal powder and/or non-magnetic powder used. The aliphatic acid ester is used in an amount of generally from 0.5 to 3.0 parts by weight, preferably from 0.7 to 2.5 parts by weight based on 100 parts by weight of the ferromagnetic metal powder and/or non-magnetic powder (for lower layer) used.

Specific examples of abrasives to be incorporated in the magnetic layer of the present invention include commonly used materials such as α-alumina, γ-alumina, molten alumina, corundum, artificial corundum, silicon nitride, chromium oxide ($Cr_2O_3$), diamond, artificial diamond, garnet, emery (main component: corundum, magnetite), and α-$Fe_2O_3$. These abrasives have a Mohs' hardness of not less than 6. Specific examples of the abrasives to be used in the present invention include AKP-10, AKP-12, AKP-15, AKP-20, AKP-30, AKP-50, AKP-80, AKP-100, AKP-1520, AKP-1500, HIT-50, HIT-60A, HIT-70, HIT-80, HIT-82, and HIT-100 (available from Sumitomo Chemical Co., Ltd.), G5, G7, S-1, and Chromium Oxide K (available from Nippon Chemical Industrial Co., Ltd.), UB40B (available from Uemura Kogyo K.K.), WA8000 and WA10000 (available from Fujimi Kenmazai K.K.), and TF-100, TF-140, and TF180 (available from Toda Kogyo K.K.). An abrasive having an average particle diameter of from 0.05 to 3 μm, preferably from 0.05 to 1.0 μm has a good abrasion effect.

The total content of these abrasives is from 1 to 20 parts by weight, preferably from 1 to 15 parts by weight based on 100 parts by weight of the ferromagnetic metal powder used. If the total content of these abrasives falls below the above defined range, a sufficient durability cannot be obtained. On the contrary, if the total content of these abrasives exceeds the above defined range, the resulting ferromagnetic metal powder exhibits deteriorated surface properties and packing degree. These abrasives may be previously dispersed in a binder before being incorporated in the magnetic coating.

The magnetic layer of the magnetic recording medium of the present invention may comprise an electrically conductive particle incorporated therein as an antistatic agent besides the foregoing components. However, in order to maximize the saturation magnetization of the uppermost layer in a multi-layer structure, such an antistatic agent is preferably incorporated in the uppermost layer in an amount as small as possible. It is preferably incorporated in the other layers. As such an antistatic agent there may be preferably used carbon black to reduce the total surface electrical resistivity of the medium. As such carbon black there can be used furnace black for rubber, thermal black for rubber, black for color, electrically conductive carbon black, acetylene black, etc. Such carbon black preferably has a specific surface area of from 5 to 500 $m^2/g$, DBP oil adsorption of from 10 to 1,500 ml/100 g, average particle diameter of from 5 mμ to 300 mμ, pH value of from 2 to 10, water content of from 0.1 to 10%, and tap density of from 0.1 to 1 g/ml. Specific examples of carbon black to be used in the present invention include BLACKPEARLS 2000, 1300, 1000, 900, 800, 700, and VULCAN XC-72 (produced by Cabot Co., Ltd.), #80 , #60 , #55 , #50, and #35 (produced by Asahi Carbon Co., Ltd.), #3950B, #3250B, #2700, #2650 , #2600, #2400B, #2300, #900, #1000, #95, #30, #40, #10B, MA230, MA220, and MA77 (produced by Mitsubishi Chemical Corporation), CONDUCTEX SC, RAVEN 150, 50, 40 and 15 (produced by Columbia Carbon Co., Ltd.), and Ketjen Black EC, Ketjen Black ECDJ-500 and Ketjen Black ECDJ-600 (produced by Lion Agzo Co., Ltd.). These carbon blacks may be surface-treated with a dispersant, acid-treated, grafted with a resin or partially graphtized before use. These carbon blacks may be previously dispersed in a binder before being added to the magnetic coating solution. The amount of carbon black, when incorporated in the magnetic layer, is preferably from 0.1 to 30% by weight based on the weight of the ferromagnetic powder. The non-magnetic layer described later preferably comprises carbon black incorporated in an amount of from 3 to 20% by weight based on the total weight of the non-magnetic powder.

In general, carbon black not only serves to inhibit the electrification of the magnetic layer but also serves to reduce the coefficient of friction of the magnetic layer with the magnetic head, give light shielding effect and improve film strength. Different carbon blacks have different effects. Accordingly, it goes without saying that the kind, amount and combination of these carbon blacks can be properly altered depending on the purpose in the light of the foregoing various properties such as particle size, oil absorption, electrical conductivity and pH. For carbon black employable in the present invention, reference can be made to, e.g., "Introduction to Carbon Black", edited by Carbon Black Association.

The layer structure of the magnetic recording medium of the present invention is not specifically limited so far as it comprises at least one magnetic layer provided on a non-magnetic support. For example, a non-magnetic layer may be provided between the magnetic layer and the non-magnetic support. Alternatively, the magnetic layer or non-magnetic layer may consist of two or more layers.

In the present invention, two or more coated layers may be effectively formed on the non-magnetic support to prepare a magnetic recording medium having a high recording density. To this end, the simultaneous coating method is particularly desirable for the preparation of an ultrathin magnetic layer. In the case where two or more magnetic layers are provided, the layer provided closer to the non-magnetic support is called a lower layer while the layer provided less close to the non-magnetic support is called an upper layer. Specific examples of the wet-on-wet coating method which can be employed as such a simultaneous coating method include the following methods:

(1) Method which comprises coating a lower layer by means of a gravure coating apparatus, roll coating apparatus, blade coating apparatus or extrusion coating apparatus commonly used for magnetic coating solution, and then coating an upper layer on the lower layer by means of a non-magnetic support pressure type extrusion coating apparatus disclosed in JP-B-1-46186, and JP-A-60-238179 and 2-265672 while the lower layer is wet;

(2) Method which comprises coating the lower layer coating solution and the upper coating solution almost simultaneously by means of a coating head incorporating two coating solution passage slits as disclosed in JP-A-63-88080, 2-17971, and 2-265672; and (3) Method which comprises coating the lower layer coating solution and the upper layer coating solution almost simultaneously by means of an extrusion coating apparatus with a back-up roll as disclosed in JP-A-2-174965.

If the wet-on-wet process is used to apply a non-magnetic layer as a lower layer and a magnetic layer as an upper layer to a non-magnetic support, the fluidity of the magnetic layer coating solution and the non-magnetic layer coating solution are preferably close to each other as much as possible to provide a magnetic layer having a uniform thickness free of disturbance of interface with the non-magnetic layer. The fluidity of the coating solution greatly depends on the combination of the particles and the binder resin in the coating solution. Special care must be taken to the selection of the non-magnetic powder to be incorporated in the non-magnetic layer.

The non-magnetic support of the magnetic recording medium of the present invention normally has a thickness of from 1 to 100 $\mu$m, preferably from 3 to 20 $\mu$m if the magnetic recording medium is used as a tape or from 40 to 80 $\mu$m if the magnetic recording medium is used as a flexible disc medium. The non-magnetic layer normally has a thickness of from 0.5 to 10 $\mu$m. The magnetic layer normally has a thickness of from 0.05 to 2.5 $\mu$m, preferably from 0.05 to 2.0 $\mu$m, more preferably from 0.10 to 1.0 $\mu$m. Layers other than the foregoing magnetic layer and nonmagnetic layer may be additionally formed depending on the purpose. For example, an interlayer such as undercoating layer for enhancing the adhesion between the non-magnetic support and the lower non-magnetic layer may be provided interposed between the non-magnetic support and the lower non-magnetic layer. The thickness of the interlayer is from 0.01 to 2 $\mu$m, preferably from 0.05 to 0.5 $\mu$m. A back coating layer may be provided on the surface of the non-magnetic support opposite the magnetic layer. The thickness of the back coating layer is from 0.1 to 2 $\mu$m, preferably from 0.3 to 1.0 $\mu$m. The undercoating layer and back coating layer may be made of any known materials. In the case of disc magnetic recording media, the foregoing layer structure may be provided on one or both sides thereof.

The non-magnetic support employable in the present invention is not specifically limited but may be made of any commonly used materials. Examples of the materials constituting the non-magnetic support include film of various synthetic resins such as polyethylene terephthalate, polyethylene, polypropylene, polycarbonate, polyethylene naphthalate, polyamide, polyamide imide, polyimide, polysulfone and polyether sulfone, and metal foils such as aluminum foil and stainless steel foil.

In order to effectively accomplish the objects of the present invention, the non-magnetic support to be used preferably exhibits a surface roughness of not more than 0.03 $\mu$m, more preferably not more than 0.02 $\mu$m, particularly preferably not more than 0.01 $\mu$m as calculated in terms of the center-line average surface roughness (Ra)(cutoff value: 0.25 mm). Further preferably, these non-magnetic supports not only have a small center-line average surface roughness but also are free of coarse protrusions having a size of not less than 1 $\mu$m. The roughness of the surface of these non-magnetic supports can be freely controlled by the size and amount of fillers which are optionally added thereto. Examples of such the fillers include oxides and carbonates of Ca, Si and Ti, and finely divided powder of acrylic organic resins. The non-magnetic support to be used in the present invention preferably exhibits F-5 values of 5 to 50 kg/mm$^2$ in the web running direction and 3 to 30 kg/mm$^2$ in the web width direction. In general, F-5 value in the web lengthwise direction is higher than F-5 value in the web width direction. However, if the crosswise strength of the non-magnetic support needs to be high, the present invention is not limited to this specification.

The non-magnetic support preferably exhibits a lengthwise and crosswise heat shrinkage of 3% or less, more preferably 1.5% or less at 100° C. for 30 minutes and 1% or less, more preferably 0.5% or less at 80° C. for 30 minutes. The breaking strength of the support is preferably in the range of 5 to 100 kg/mm$^2$ in both directions. The elastic modulus of the support is preferably in the range of 100 to 2,000 kg/mm$^2$ in both directions.

Examples of organic solvents which can be used in the present invention include ketones such as acetone, methyl ethyl ketone, methyl isobutyl ketone, diisobutyl ketone, cyclohexanone, isophorone and tetrahydrofuran; alcohols such as methanol, ethanol, propanol, butanol, isobutyl alcohol, isopropyl alcohol and methyl cyclohexanol; esters such as methyl acetate, butyl acetate, isobutyl acetate, isopropyl acetate, ethyl butyrate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chloroform, ethylene chlorohydrin and dichlorobenzene; N,N-dimethylformamide; and hexane. These organic solvents may be used in any proportions. These organic solvents are not necessarily 100%-pure and may contain impurities such as isomers, unreacted matters, side reaction products, decomposition products, oxides and water content besides main components. The content of these impurities is preferably in the range of 30% or less, more preferably 10% or less. If necessary, the kind and amount of organic solvents to be used in the present invention may be altered from the magnetic layer to the lower layer. For example, a highly volatile solvent may be used for the upper layer coating solution to improve the surface properties of the magnetic layer. Further, a solvent having a high surface tension (e.g., cyclohexanone, dioxane) can be used for the lower layer coating solution to improve the coating stability. Moreover, a solvent having a high solubility parameter can be used for the lower layer coating solution to enhance the packing density of the lower layer. It goes without saying that the present invention is not limited to these examples.

The magnetic recording medium of the present invention can be obtained by kneading the foregoing ferromagnetic metal powder and binder resin with an organic solvent, optionally with other additives, to obtain a magnetic coating solution in the form of a dispersion, applying the magnetic coating solution to a non-magnetic support, optionally orienting the magnetic layer, and then drying the coating solution.

The process for the preparation of the magnetic coating solution for the magnetic layer of the magnetic recording medium of the present invention comprises at least a kneading step, dispersion step, and mixing step which is optionally provided before or after these steps. These steps each may consist of two or more stages. The raw materials to be used in the present invention, e.g., ferromagnetic metal powder, binder, carbon black, abrasive, antistatic agent, lubricant and solvent may be added to the system at any stage in any step. These raw materials each may be batchwise added to the system at two or more steps. For example, polyurethane may be batchwise charged in the system at the kneading step, dispersion step or a mixing step for the viscosity adjustment after dispersion.

The kneading and dispersion of the magnetic coating solution can be accomplished by means of various kneaders. For example, two-roll mill, three-roll mill, ball mill, pebble mill, Trommel mill, sand grinder, Szegvari, attritor, high speed impeller dispersing machine, high speed stone mill, high speed impact mill, disper, kneader, high speed mixer, homogenizer, ultrasonic dispersing machine, etc. may be used.

The non-magnetic coating solution to be used in the present invention can be prepared according to the method for the preparation of the foregoing magnetic coating solution.

In order to accomplish the objects of the present invention, a well-known preparation technique can, of course, be used as a step. In the kneading step, an apparatus having a strong kneading power such as continuous kneader and pressure kneader can be used to enhance the output and C/N of the magnetic recording medium of the present invention. When a continuous kneader or pressure kneader is used, the magnetic grains are kneaded with the whole or part (preferably 30% by weight or more of the total weight of all binder resins) in an amount of from 15 to 500 parts by weight based on 100 parts by weight of ferromagnetic metal powder. These kneading techniques are further described in JP-A-1-106388 and 64-79274. In the present invention, a simultaneous multi-layer coating method as disclosed in JP-A-62-212933 can be used to give a higher efficiency in the preparation of the magnetic recording medium.

The amount of the residual solvent in the magnetic layer of the magnetic recording medium of the present invention is preferably not more than 100 mg/m$^2$, more preferably not more than 10 mg/m$^2$. The residual solvent in the magnetic layer is preferably less than that in the non-magnetic layer.

The magnetic recording medium of the present invention preferably has voids of not more than 30% by volume, more preferably not more than 10% by volume in both the underlayer and uppermost layer. The voids of the non-magnetic layer are preferably greater than that of the magnetic layer. However, the voids of the magnetic layer may be smaller than that of the non-magnetic layer so far as the voids of the non-magnetic layer is not less than 5%.

The magnetic recording medium of the present invention comprises a lower layer and an upper layer. It can easily be presumed that the physical properties of the magnetic recording medium may be altered from the lower layer to the upper layer. For example, the elasticity of the upper layer can be enhanced to improve the running durability thereof while the elasticity of the lower layer can be lower than that of the upper layer (i.e., magnetic layer) to improve the contact of the magnetic recording medium with the head.

The magnetic layer which has thus been applied to the support may be optionally treated such that the ferromagnetic metal powder contained therein is oriented, followed by drying. If necessary, the magnetic layer thus formed may be surface-smoothened or cut into a desired shape to prepare a magnetic recording medium according to the present invention.

The magnetic layer preferably has an elastic modulus of from 100 to 2,000 Kg/mm$^2$ and a break strength of from 1 to 30 Kg/cm$^2$ at an elongation of 0.5% in both the web coating direction and crosswise direction. The magnetic recording medium preferably has an elastic modulus of from 100 to 1,500 Kg/mm$^2$ in both the web coating direction and crosswise direction, a residual elongation of not more than 0.5%, and a heat shrinkage of not more than 1%, more preferably not more than 0.5%, most preferably not more than 0.1%, at various temperatures of below 100° C.

The magnetic recording medium of the present invention may be in the form of tape for use in video or audio recording or flexible disc or magnetic (hard) disc for use in data recording. The magnetic recording medium of the present invention is useful particularly for digital recording where the lack of signal due to the generation of dropout is fatal. By providing such an arrangement that the thickness of the upper layer is not more than 0.5 µm, a high density and large capacity magnetic recording medium which has high electromagnetic characteristics and excellent overwrite characteristics can be obtained.

EXAMPLE

The present invention will be further described in the following examples, but the present invention should not be construed as being limited thereto. The term "parts" as used herein is meant to indicate "parts by weight" unless otherwise specified.

Examples 1-1 to 1-4; Comparative Examples 1-1 to 1-2

Preparation Example 1 of Ferromagnetic Metal Powder

To a 20° C. aqueous solution of ferrous sulfate into which nitrogen had been bubbled for inhibition of oxidation was added a solution of sodium hydroxide in an amount of 60% of the neutralization equivalent to form ferrous sulfate. The system was then subjected to air oxidation while being kept at 20° C. to form goethite nuclei. To the system was then added an aqueous nickel sulfate solution (Ni/Fe atomic ratio: 5%). To the slurry into which nitrogen had been bubbled for inhibition of oxidation was then added an aqueous solution of sodium hydroxide in an amount of 1.1 times the neutralization equivalent of iron ion and nickel ion in the suspension. The slurry was then subjected to air oxidation while being kept at 40° C. to allow nickel-containing goethite to grow. The goethite thus obtained was then filtered with rinsing.

The nickel-containing goethite thus rinsed was then dispersed in water to prepare a 2% suspension. To the suspension was then added an aqueous solution of cobalt sulfate (Co/Fe atomic ratio: 5%; described also in the column of additive element in Table 1). The mixture was then neutralized with an aqueous solution of sodium hydroxide. To the mixture was then added an aqueous solution of sodium aluminate in an amount such that the Al/Fe atomic ratio (%) set forth in the subcolumn of Al of the column of sintering inhibitor in Table 1 was reached. The mixture was then neutralized with diluted sulfuric acid. To the mixture was then added an aqueous solution of sodium silicate in an amount such that the Si/Fe atomic ratio (%) set forth in the subcolumn of Si of the column of sintering inhibitor in Table 1 was reached. The mixture was then neutralized with diluted sulfuric acid so that it was subjected to surface treatment. The material was washed with water, and then filtered. The resulting cake was passed through a forming machine, and then dried (Examples 1-1 to 1-4).

Separately, another batch of the nickel-containing goethite rinsed was dispersed in water to prepare a 2% suspension. To the suspension was then added an aqueous solution of sodium aluminate (as set forth in the column of Al (%) in Table 1). The mixture was neutralized with diluted sulfuric acid, washed with water, and then filtered. The resulting cake was passed through a forming machine, and then dried (Comparative Example 1-1). A further batch of the nickel-containing goethite rinsed was dispersed in water to prepare a 2% suspension. To the mixture was then added an aqueous solution of cobalt sulfate in an amount such that the Co/Fe atomic ratio was 5%. The mixture was then neutralized with an aqueous solution of sodium hydroxide. To the mixture was then added an aqueous solution of sodium silicate in an amount such that the value set forth in the column of Si (%) in Table 1 was reached. The mixture was then neutralized with diluted sulfuric acid so that it was subjected to surface treatment. The material was washed with water, and then filtered. The resulting cake was passed through a forming machine, and then dried (Comparative Example 1-2). For this reaction and rinsing, distilled water was used.

The goethite materials treated with a sintering inhibitor were each put in a stationary reducing furnace in which it was then heated to a temperature of 350° C. in nitrogen for 30 minutes so that it was dehydrated. The material was then heated to a temperature of 650° C., for 2 hours to enhance the crystallinity of hematite. The atmosphere in the furnace was changed from nitrogen to hydrogen gas in which the material was then subjected to reduction at a temperature of 450° C. for 6 hours. The atmosphere in the furnace was changed back to nitrogen in which the material was then allowed to cool to room temperature. The mixing ratio of air and nitrogen in the atmosphere in the furnace was then changed so that the oxygen concentration was 0.2%. In this atmosphere, the material was then subjected to gradual-oxidation at a temperature of not higher than 50° C. while the temperature of the ferromagnetic metal powder was being monitored. When the heat generation was over, the oxygen concentration was raised to 1%. In this atmosphere, the material was then subjected to gradual-oxidation for 10 hours. Thereafter, distilled water was passed through the system with air while being vaporized in such a manner that the water content of the material was 1% based on the ferromagnetic metal powder so that the material was moisture-conditioned.

The ferromagnetic metal powder thus obtained was then measured for magnetic characteristics, produced amount of iron complex, specific surface area and water-soluble sodium, calcium, magnesium and iron salt contents. For the measurement of the magnetic characteristics of the ferromagnetic metal powder thus obtained, a vibrating sample magnetometer (available from Toei Industry Co., Ltd.) was used. The measurement was conducted in an external magnetic field of 10 KOe. For the measurement of specific surface area, the ferromagnetic metal powder was dehydrated at a temperature of 250° C. in nitrogen for 30 minutes. Using Quantasorb (available from Quantachrome Co., Ltd.), the specific surface area of the specimen was measured by BET-1 point method. For the measurement of water-soluble sodium, calcium and magnesium salt contents, 5 g of the ferromagnetic metal powder was extracted with 100 ml of distilled water at room temperature for 1 hour. The resulting liquid was then filtered. The filtrate was then measured for sodium content by atomic-absorption spectroscopy and calcium anti iron contents by ICP. The results are shown in Table 1.

TABLE 1

| Ferromagnetic metal powder | Added element Co | Sintering inhibitor | | Hc (Oe) | σs (emu/g) | Specific surface area (m²/g) | Produced amount of iron complex (ppm/g) | Water-soluble element (ppm/g) | | | |
|---|---|---|---|---|---|---|---|---|---|---|---|
| | | Al(%) | Si(%) | | | | | Na | Ca | Mg | Fe |
| Example 1-1 | 5 | 6.0 | 0.0 | 1,620 | 136.0 | 55.0 | 7.5 | 75 | 4.0 | 0.0 | 0.0 |
| Example 1-2 | 5 | 8.0 | 0.0 | 1,675 | 134.5 | 53.5 | 5.2 | 80 | 5.0 | 0.0 | 0.0 |
| Example 1-3 | 5 | 5.0 | 2.5 | 1,690 | 135.5 | 57.7 | 8.8 | 85 | 0.0 | 0.0 | 55.0 |
| Example 1-4 | 5 | 8.0 | 2.5 | 1,610 | 137.4 | 62.8 | 6.0 | 72 | 0.0 | 0.0 | 52.0 |
| Comparative Example 1-1 | 0 | 8.0 | 0.0 | 1,585 | 130.3 | 58.5 | 12.5 | 90 | 6.2 | 0.0 | 0.0 |
| Comparative Example 1-2 | 5 | 0.0 | 3.0 | 1,780 | 142.5 | 48.0 | 19.5 | 135 | 6.5 | 0.0 | 10.5 |

Examples 2-1 to 2-4; Comparative Example 2-1
Preparation Example 2 of Ferromagnetic Metal Powder To a mixture of 35 l of a 1.7 mol/l sodium carbonate and 15 l of a 2.0 mol/l sodium hydroxide was added 0.6 l of a 0.25 mol/l aqueous solution of sodium citrate in a 150-l tank equipped with an agitator. While nitrogen was being blown through the system at a temperature of 20° C., to the mixture was then added 40 l of a 20° C. aqueous solution of ferrous sulfate and cobalt sulfate ($Fe^{2+}$ concentration: 1.35 mol/l; Co concentration: 0.067 mol/l) which had been prepared with the bubbling with nitrogen in a separate tank with stirring. The reaction mixture was stirred for 10 minutes. The resulting suspension was then adjusted to a temperature of 25° C. to produce a precipitate mainly composed of ferrous iron.

The gas to be introduced into the system was changed from nitrogen to air to oxidize the precipitate. As a result, goethite nuclei were produced. When $Fe^{2+}$ concentration in the suspension reached 0.75 mol/l, the air oxidation was suspended and the gas to be introduced into the system was changed to nitrogen. The suspension was heated to a temperature of 40° C. where it was then allowed to stand for 2 hours. To the suspension was then added 1.5 l of a 1.1 mol/l aqueous solution of sodium aluminate. Thereafter, the gas to be introduced into the system was changed from nitrogen to air so that oxidation reaction proceeded to produce spindle-shaped goethite having Al solid-dissolved therein. The resulting particle was filtered, and then washed with water. The particle was partly extracted, dried, and then photographed under transmission electron microscope to determine its average particle diameter. As a result, it was found that the particle has an average long axis length of 0.10 μm and an average acicular ratio of 7. The particle was heated to a temperature of 120° C. in nitrogen for 30 minutes so that it was dehydrated, and then measured for specific surface area. As a result, the particle was found to have a specific surface area of 110 $m^2/g$. Goethite thus obtained was passed through a forming machine, dried, and then heated to a temperature of 300° C. for 1 hour so that it was dehydrated to produce hematite.

Hematite thus obtained was then subjected to dispersion with water having a pH value of about 11 by means of a sand grinder to form a 2% slurry. To the hematite slurry were then added an aqueous solution of cobalt sulfate and an aqueous solution of magnesium chloride set forth in the column of added element in Table 2 (represented by Co/Fe and Mg/Fe atomic ratio (%)) with stirring. The mixture was then neutralized with an aqueous ammonia to cause cobalt and magnesium compounds to be deposited on the surface of hematite particles. The slurry was then filtered. The slurry was then again prepared as a 2% aqueous slurry. To the slurry was then added an aqueous solution of aluminum sulfate (in such an amount that Al/Fe atomic ratio (%) set forth in the subcolumn of Al in the column of sintering inhibitor in Table 2 was reached). The slurry was then stirred for 20 minutes. To the slurry was then added a diluted aqueous ammonia so that it was neutralized. The slurry was filtered, and then washed with water. The slurry was then prepared as a 2% slurry. To the slurry was then added an aqueous solution of yttrium nitrate (in such an amount that Y/Fe atomic ratio (%) set forth in the column of Y in the column of sintering inhibitor in Table 2 was reached). The slurry was then adjusted with an aqueous ammonia to a pH value of 8.5. The slurry was filtered, and then washed with water. The slurry was prepared as a 5% aqueous slurry which was then subjected to hydrothermal treatment at a temperature of 150° C. for 1 hour. Thereafter, the slurry was filtered, and then washed with water to obtain a cake. The cake thus obtained was passed through a forming machine, and then dried to obtain a spindle-shaped hematite which had been subjected to anti-sintering treatment (Examples 2-1 to 2-4). The procedure as mentioned above was followed except that elements set forth in Table 2 were added and the anti-sintering treatment was effected with yttrium nitrate alone without combination with aluminum sulfate (Comparative Example 2-1). For these reactions and rinsing steps, distilled water was used.

The spindle-shaped hematite which had been subjected to anti-sintering treatment was put in a stationary reducing furnace where it was then heated to a temperature of 350° C. in nitrogen for 30 minutes. The material was then heated to a temperature of 650° C. for 2 hours to enhance the crystallinity of hematite. The system temperature was then lowered to 400° C. where the material was subjected to reduction with a 20:80 gaseous mixture of hydrogen and CO which replaced nitrogen for 1 hour. The atmosphere in the system was then replaced by nitrogen. The atmosphere in the system was replaced by pure hydrogen in which the material was then subjected to reduction for 5 hours. The atmosphere in the system was replaced by nitrogen in which the material was then allowed to cool to room temperature. The mixing ratio of air and nitrogen in the atmosphere was changed such that the oxygen concentration was 0.2%. In this atmosphere, the material was then subjected to gradual-oxidation at a temperature of not higher than 50° C. while the temperature of the ferromagnetic metal powder was being monitored. When the heat generation was suspended, the oxygen concentration was raised to 1% where the material was then subjected to gradual-oxidation for 10 hours. Thereafter, distilled water was passed through the system with air while being vaporized in such a manner that the water content of the material was 1% based on the ferromagnetic metal powder so that the material was moisture-conditioned. The ferromagnetic metal powder thus obtained was then measured for magnetic characteristics, produced amount of iron complex, specific surface area and water-soluble sodium, calcium, magnesium and iron ion contents. For the measurement of the magnetic characteristics of the ferromagnetic metal powder thus obtained, a vibrating sample type magnetometer (available from Toei Industry Co., Ltd.) was used. The measurement was conducted in an external magnetic field of 10 KOe. For the measurement of specific surface area, the ferromagnetic metal powder was dehydrated at a temperature of 250° C. in nitrogen for 30 minutes. Using Quantasorb (available from Quantachrome Co., Ltd.), the specific surface area of the specimen was measured by BET-1 point method. For the measurement of water-soluble sodium, calcium, magnesium and iron ion contents, 5 g of the ferromagnetic metal powder was extracted with 100 ml of distilled water at room temperature for 1 hour. The resulting liquid was then filtered. The filtrate was then measured for sodium content by atomic-absorption spectroscopy and calcium, magnesium and iron contents by ICP. The eluted amount of Fe was 0 ppm in all the examples. The results are set forth in Table 2.

TABLE 2

| Ferromagnetic metal powder | Added element | | Sintering inhibitor | | Hc | σs | Specific surface area | Produced amount of iron complex | Water-soluble element (ppm/g) | | |
|---|---|---|---|---|---|---|---|---|---|---|---|
| | Mg | Co | Al(%) | Y(%) | (Oe) | emu/g | ($m^2$g) | (ppm/g) | Na | Ca | Mg |
| Example 2-1 | 0.5 | 0.0 | 7.0 | 5.0 | 1,900 | 136.0 | 53.4 | 5.0 | 15 | 7 | 2.5 |
| Example 2-2 | 0.5 | 5 | 7.0 | 7.0 | 2,120 | 140.5 | 52.5 | 3.2 | 10 | 5 | 2.8 |

TABLE 2-continued

| Ferromagnetic metal powder | Added element | | Sintering inhibitor | | Hc | σs | Specific surface area | Produced amount of iron complex | Water-soluble element (ppm/g) | | |
|---|---|---|---|---|---|---|---|---|---|---|---|
| | Mg | Co | Al(%) | Y(%) | (Oe) | emu/g | (m²g) | (ppm/g) | Na | Ca | Mg |
| Example 2-3 | 0.5 | 15 | 5.0 | 8.0 | 2,240 | 143.5 | 50.4 | 2.8 | 8 | 5 | 2.3 |
| Example 2-4 | 0.5 | 25 | 5.0 | 8.0 | 2,310 | 148.4 | 51.3 | 2.5 | 7 | 4 | 2.7 |
| Comparative Example 2-1 | 0.5 | 0.0 | 0.0 | 5.0 | 1,800 | 135.5 | 48.3 | 11.5 | 10 | 6 | 3.2 |

Examples 3-1 to 3-6; Comparative Example 3-1
Preparation Example of Non-magnetic Powder for Lower Layer To a 20° C. aqueous solution of ferrous sulfate into which nitrogen had been bubbled for inhibition of oxidation was added sodium silicate (Si/Fe atomic ratio: 1%). To the mixture was then added a solution of sodium hydroxide in an amount of 60% of the neutralization equivalent to form ferrous sulfate. The system was then subjected to air oxidation while being kept at 20° C. to form goethite nuclei. To the slurry into which nitrogen had been bubbled for inhibition of oxidation was then added an aqueous solution of sodium hydroxide. Under these conditions, the slurry was subjected to air oxidation while being kept at 40° C. to prepare goethite. The goethite thus obtained was filtered with water. The cake thus obtained was passed through a forming machine, and then dried. The goethite thus obtained exhibited a specific surface area of 112 m²/g. The goethite was allowed to stand at a temperature of 300° C. in a calcining furnace for 1 hour so that it was dehydrated to produce α-Fe$_2$O$_3$ which was then annealed at a temperature of 600° C. for 2 hours. α-Fe$_2$O$_3$ thus obtained was mixed with a 0.01N aqueous solution of sodium hydroxide, and then ground by a sand grinder. To the material was then added water to prepare a suspension having a slurry concentration of 2%. To the suspension was then added aluminum in the form of aluminum sulfate solution in a predetermined amount based on Fe in the suspension (represented by atomic percent (%) in the subcolumn "Al/Fe" in the column of amount surface-treated in Table 3) with stirring. To the suspension was then added sodium hydroxide solution so that the pH value thereof was adjusted to 9.0. The suspension was allowed to stand at a temperature of 80° C. for 1 hour, filtered, rinsed, dried, and then compacted (Examples 3-1 to 3-3).

The foregoing annealed α-Fe$_2$O$_3$ was mixed with a 0.01N aqueous solution of sodium hydroxide, and then ground by a sand grinder. To the material was then added water to prepare a suspension having a slurry concentration of 2%. To the suspension was then added aluminum in the form of aluminum sulfate solution in a predetermined amount based on Fe in the suspension (represented by atomic percent (%) in the subcolumn "Al/Fe" in the column of amount surface-treated in Table 3) with stirring. To the suspension was then added sodium hydroxide solution so that the pH value thereof was adjusted to 8.0. To the suspension was then added silicon in the form of sodium silicate in a predetermined amount based on Fe (represented by atomic percent (%) in the subcolumn "Si/Fe" in the column of amount surface-treated in Table 3). Carbon dioxide gas was then passed through the suspension so that the pH value thereof was adjusted to 7.5. The suspension was allowed to stand at a temperature of 80° C. for 1 hour, filtered, rinsed, dried, and then compacted (Examples 3-4 to 3-5).

The foregoing slurry which had not yet been treated with Al and Al—Si was allowed to stand at a temperature of 80° C. for 1 hour, filtered, rinsed, dried, and then densified (Example 3-6).

The foregoing annealed α-Fe$_2$O$_3$ was slurried free of alkali, filtered, rinsed, dried, and then densifieded to prepare a densified α-Fe$_2$O$_3$ (Comparative Example 3-1).

For these reactions and rinsing procedures, distilled water was used.

α-Fe$_2$O$_3$ thus obtained was then measured for pH, produced amount of iron complex, specific surface area and water-soluble sodium, calcium, magnesium and iron ion contents. For the measurement of specific surface area, a α-Fe$_2$O$_3$ was dehydrated at a temperature of 250° C. for 30 minutes. Using Quantasorb (available from Quantachrome Co., Ltd.), the specific surface area of the specimen was measured by BET-1 point method. For the measurement of water-soluble sodium, calcium, magnesium and iron ion contents, 5 g of α-Fe$_2$O$_3$ was extracted with 100 ml of distilled water for 1 hour. The resulting liquid was then filtered. The filtrate was then measured for sodium content by atomic-absorption spectroscopy and calcium, magnesium and iron contents by ICP. The results are set forth in Table 3.

No relationships were recognized between the amount of iron and the produced amount of iron complex as determined by the extraction of ferromagnetic metal powder and non-magnetic iron oxide with water. This is probably because water-extracted iron (or water-soluble iron) is analyzed with a colloidal iron compound contained therein depending on the process for the preparation of raw material. It is necessary herein that the ionizable amount of iron be small.

TABLE 3

| Non-magnetic powder | Amount surface-treated (%) | | | Produced amount of iron complex | Specific surface area | Water-soluble element (ppm/g) | | | |
|---|---|---|---|---|---|---|---|---|---|
| | Al/Fe | Si/Fe | pH | (ppm/g) | (m²/g) | Na | Ca | Mg | Fe |
| Example 3-1 | 3 | 0 | 8.5 | 2.1 | 55.3 | 27 | 12 | 5 | 35 |
| Example 3-2 | 5 | 0 | 8.8 | 1.8 | 55.5 | 30 | 11 | 6 | 31 |
| Example 3-3 | 7 | 0 | 9.4 | 1.2 | 57.4 | 32 | 12 | 5 | 30 |
| Example 3-4 | 5 | 1 | 7.5 | 3.6 | 56.1 | 35 | 10 | 4 | 45 |
| Example 3-5 | 5 | 1.5 | 7.2 | 4.4 | 56.6 | 22 | 15 | 7 | 40 |
| Example 3-6 | 0 | 0 | 6.1 | 7.0 | 54.3 | 120 | 5 | 15 | 37 |
| Comparative Example 3-1 | 0 | 0 | 3.5 | 12.7 | 54.2 | 250 | 45 | 25 | 48 |

Example 4
Preparation Example 1 of Magnetic Tape

In order to prepare a magnetic tape front the ferromagnetic metal powder prepared in Preparation Example 1 of ferromagnetic metal powder (Examples 1-1 to 1-4 and Comparative Examples 1-1 to 1-2), the following magnetic layer compositions were prepared.
(Magnetic layer composition)

| | |
|---|---|
| Ferromagnetic metal powder (Preparation Example 1) | 100 parts |
| Binder resin | |
| Vinyl chloride copolymer (containing —SO$_3$Na group in an amount of 1 × 10$^{-4}$ eq/g; polymerization degree: 300) | 14 parts |
| Polyester polyurethane resin (neopentyl glycol/caprolactone polyol/MDI = 0.9/2.6/1 (by mol); containing —SO$_3$Na in an amount of 1 × 10$^{-4}$ eq/g) | 6 parts |
| α-Alumina (average particle diameter: 0.15 μm) | 10 parts |
| Carbon black (average particle size: 40 nm) | 3.0 part |
| Butyl stearate | 1.5 parts |
| Stearic acid | 2.5 parts |
| 1:1 Mixture of methyl ethyl ketone and cyclohexanone | 150 parts |

The foregoing ferromagnetic metal powder and vinyl chloride copolymer and 130 parts of the 1:1 mixture of methyl ethyl ketone and cyclohexanone were kneaded by means of a kneader. To the material was then added the rest of the composition. The mixture was then subjected to dispersion by means of a sand grinder. To the dispersion thus obtained were then added 6 parts of a polyisocyanate. To the dispersion were then added 20 parts of the 1:1 mixture of methyl ethyl ketone and cyclohexanone. The dispersion was then filtered through a filter having an average pore diameter of 1 μm to prepare a coating solution for magnetic layer.

The magnetic layer coating solution was applied to a 10-μm thick polyethylene telephthalate support to a dry thickness of 2 μm. The laminate was then passed through an orientation apparatus while the magnetic layer thus applied was wet so that it was longitudinally oriented. In this orientation process, the laminate was passed under a rare earth magnet (surface magnetic flux: 5,000 gauss) and then under a solenoid magnet (magnetic flux density: 5,000 gauss) where it was dried to an extent such that the orientation thus gained cannot be out of order. The randomised magnetic layer was further dried. The laminate was then wound in a roll. The laminate was then calendered by means of a 7-stage calender composed of metal rolls which had been adjusted to a temperature of 90° C. to obtain a web magnetic recording medium. The web magnetic recording medium thus obtained was slit into 8-mm video tape samples. These samples were each measured for magnetic characteristics, surface roughness, initial friction coefficient, friction coefficient after 7 days of storage at 60° C. and 90% RH, output and S/N ratio by a 8-mm video deck, and produced amount of iron complex on the tape. The results are set forth in Table 4. For the measurement of electromagnetic characteristics, a 8-mm video HG tape (available from Fuji Photo Film Co., Ltd.) was used as a standard.

For the measurement of magnetic characteristics, a vibrating sample magnetometer was used. The measurement was effected in an external magnetic field of 10 kOe. In Table 4, SQ indicates squareness ratio.

For the measurement of surface roughness, a light interference three-dimensional roughness meter "TOPO-3D" [available from WYKO (Arizona, U.S.A.)] was be used. The specimen was measured over an area of 250 μm square. For the calculation of measurements, corrections such as inclination correction, spherical surface correction and cylinder correction were made according to JIS-B601 so that the central surface average roughness Ra is defined as surface roughness.

For the measurement of initial friction coefficient and friction coefficient after storage, the tape was brought into contact with a stainless pole at a tension T1 of 50 g and a winding angle of 180 degree. Under these conditions, the tension T2 required to allow the tape to run at a rate of 3.3 cm/sec was measured. From these measurements, the friction coefficient was determined by the following calculation. The results are set forth in Table 4.

$$\mu = 1/\pi \cdot ln(T2/T1)$$

The produced amount of iron complex on the tape was determined as follows:

7.94 m of the 8-mm tape thus prepared was dipped in 50 ml of an ethanol solution of 0.05 mol of benzohydroxamic acid at 25° C. for 20 hours. The resulting solution was then filtered. The filtrate was then measured for absorbance. From Bm of the tape, thickness of the magnetic layer and as of the magnetic material, the weight of ferromagnetic metal in the sample was calculated. The amount of iron complex produced on the magnetic recording medium per unit area corresponding to 1 g of ferromagnetic metal powder in the tape was calculated from the absorbance on the calibration curve.

TABLE 4

| Magnetic recording medium | Ferromagnetic metal powder | Magnetic characteristics | | | | Ini. abrasion coefficient | Abrasion coefficient after storage | Surface roughness (nm) | Output (dB) | S/N (dB) | Produced amount of iron complex on tape (ppm/g) |
|---|---|---|---|---|---|---|---|---|---|---|---|
| | | Hc (Oe) | SQ | BM (G) | SFD | | | | | | |
| Example 4-1 | Example 1-1 | 1690 | 0.85 | 3950 | 0.42 | 0.25 | 0.34 | 3.2 | 0.5 | 0.4 | 4.5 |
| Example 4-2 | Example 1-2 | 1740 | 0.85 | 3760 | 0.43 | 0.26 | 0.33 | 3.3 | 0.4 | 0.3 | 3.2 |
| Example 4-3 | Example 1-3 | 1755 | 0.86 | 3870 | 0.44 | 0.25 | 0.37 | 3.2 | 0.6 | 0.5 | 5.1 |
| Example 4-4 | Example 1-4 | 1670 | 0.84 | 3940 | 0.43 | 0.24 | 0.34 | 3.3 | 0.3 | 0.3 | 3.5 |
| Comparative Example 4-1 | Comparative Example 1-1 | 1645 | 0.83 | 3650 | 0.45 | 0.26 | 0.75 | 3.5 | 0.0 | −0.1 | 8.5 |
| Comparative Example 4-2 | Comparative Example 1-2 | 1835 | 0.84 | 3960 | 0.44 | 0.23 | 0.88 | 3.6 | 0.2 | −0.3 | 12.0 |

Despite their somewhat high surface roughness, the samples of Comparative Examples 4-1 and 4-2 exhibited an increased friction coefficient after stored, showing deteriorated running properties. These comparative samples showed the production of iron complex on the tape in an amount of about 3 to 4 times that of the examples of the present invention.

Examples 5-1 to 5-11; Comparative Examples 5-1 to 5-5

In order to prepare multi-layer magnetic tapes comprising the ferromagnetic metal powders (Examples 2-1 to 2-4 and Comparative Example 2-1) obtained in Preparation Example 2 and $TiO_2$ described later or the non-magnetic powders obtained in Examples 3-1 to 3-6 and Comparative Example 3-1, the following magnetic layer composition and lower non-magnetic layer composition were prepared.

(Magnetic layer composition)

| | |
|---|---|
| Ferromagnetic metal powder (Preparation Example 2) | 100 parts |
| Binder resin | |
| Vinyl chloride copolymer (containing —$SO_3Na$ group in an amount of $1 \times 10^{-4}$ eq/g; polymerization degree: 300) | 13 parts |
| Polyester polyurethane resin (neopentyl glycol/caprolactone polyol/MDI = 0.9/2.6/1 (by mol); containing —$SO_3Na$ in an amount of $1 \times 10^{-4}$ eq/g) | 5 parts |
| 1:1 Mixture of methyl ethyl ketone and cyclohexanone | 130 parts (added during kneading) |
| α-Alumina (average particle diameter: 0.13 μm) | 5.0 parts |
| Carbon black (average particle size: 40 nm) | 1.0 part |
| Butyl stearate | 1 part |
| Stearic acid | 2 parts |
| 1:1 Mixture of methyl ethyl ketone and cyclohexanone | 140 parts (added during dispersion) |

(Lower non-magnetic layer composition)

| | |
|---|---|
| Acicular hematite (Examples 3-1 to 3-6; Comparative Example 3-1) or $TiO_2$ | 80 parts |
| α-Alumina (average particle diameter: 0.11 μm) | 5.0 parts |
| Carbon black (average primary particle diameter: 17 nm; DBP oil absorption: 80 ml/100 g; specific surface area: 240 m$^2$/g (as determined by BET method); pH: 7.5) | 20 parts |
| Binder resin | |
| Vinyl chloride copolymer (containing —$SO_3Na$ group in an amount of $1 \times 10^{-4}$ eq/g; polymerization degree: 300) | 12 parts |
| Polyester polyurethane resin (neopentyl glycol/caprolactone polyol/MDI = 0.9/2.6/1 (by mol); containing —$SO_3Na$ in an amount of $1 \times 10^{-4}$ eq/g) | 8 parts |
| 1:1 mixture of methyl ethyl ketone and cyclokexanone | 120 parts (added during kneading) |
| Butyl stearate | 1 part |
| Stearic acid | 2.5 parts |
| 1:1 Mixture of methyl ethyl ketone and cyclohexanone | 110 parts (added during dispersion) |

The magnetic coating dispersion was prepared by kneading the foregoing ferromagnetic metal powder and vinyl chloride copolymer and 130 parts of the 1:1 mixture of methyl ethyl ketone and cyclohexanone by means of a kneader, adding the rest of the magnetic layer composition to the mixture, and then subjecting the mixture to dispersion by means of a sand grinder.

The non-magnetic coating dispersion was prepared by kneading the foregoing acicular hamatite, α-alumina, carbon black and vinyl chloride copolymer and 120 parts of the 1:1 mixture of methyl ethyl ketone and cyclohexanone, adding the rest of the lower non-magnetic composition to the mixture, and then subjecting the mixture to dispersion by means of a sand grinder. Another lower layer dispersion was prepared in the same manner as above except that α-$Fe_2O_3$ to be incorporated in the lower non-magnetic layer composition was replaced by a spherical titanium oxide particle (average particle diameter: 25 nm; specific surface area: 70 m$^2$/g; alumina-treated; pH: 7.5; produced amount of iron complex: 0 ppm/g). To each of these dispersions were then added a polyisocyanate in an amount of 5 parts for lower non-magnetic layer coating solution or 6 parts for magnetic coating solution. To each of these dispersions were then added 20 parts of the 1:1 mixture of methyl ethyl ketone and cyclohexanone. These dispersions were each filtered through a filter having an average pore diameter of 1 μm to prepare a lower non-magnetic layer coating solution and a magnetic layer coating solution.

The various coating dispersions of ferromagnetic metal powder and non-magnetic powder shown in Table 5 were combined to prepare the following magnetic recording media.

The lower non-magnetic layer coating dispersion and magnetic layer coating dispersion thus obtained were then subjected to the following wet simultaneous multi-layer coating process. In some detail, the lower non-magnetic layer coating solution was applied to a 7-μm thick polyethylene terephthalate support to obtain a dry thickness of 1.5 μm. The magnetic layer coating dispersion was immediately applied to the lower non-magnetic layer thus applied while the lower non-magnetic layer was wet to obtain a thickness of 0.15 μm. The laminate was then passed through an orientation apparatus while the two layers thus applied were wet so that it was longitudinally oriented, In this orientation process, the laminate was passed under a rare earth magnet (surface magnetic flux: 5,000 gauss;) and then under a solenoid magnet (magnetic flux density: 5,000 gauss) where it was dried to an extent such that the orientation thus gained cannot be randomised. The magnetic layer was further dried. The laminate was then wound in a roll. The laminate was then calendered by means of a 7-stage calender composed of metal rolls which had been adjusted to a temperature of 90° C. to obtain a web magnetic recording medium. The web magnetic recording medium thus obtained was slit into 8-mm video tape samples. The magnetic tape thus obtained was then measured for surface roughness, initial friction coefficient, friction coefficient after 7 days of storage at 60° C. and 90% RH, magnetic characteristics (determined by a vibrating sample magnetometer) and ½ Tb output and C/N (determined by a drum tester). The results are shown in Table 5. For the measurement of electromagnetic characteristics, Super DC tape (available from Fuji Photo Film Co., Ltd.) was used as a standard.

For the measurement of surface roughness, a light interference three-dimensional roughness meter "TOPO-3D" available from WYKO (Arizona, U.S.A.) was be used. The specimen was measured over an area of 250 μm square. For the calculation of measurements, corrections such as inclination correction, spherical surface correction and cylinder correction were made according to JIS-B601 so that the central surface average roughness Ra is defined as surface roughness.

For the measurement of initial friction coefficient and friction coefficient after storage, the tape was brought into contact with a stainless pole at a tension T1 of 50 g and a winding angle of 180 degree. Under these conditions, the tension T2 required to allow the tape to run at a rate of 3.3 cm/sec was measured. From these measurements, the friction coefficient was determined by the following calculation:

$$\mu = 1/\pi \cdot ln(T2/T1)$$

For the measurement of magnetic characteristics, a vibrating sample magnetometer was used. The measurement was effected in an external magnetic field of 10 kOe.

For the measurement of the produced amount of iron complex on the tape, 7.94 m of the 8-mm tape thus prepared was dipped in 50 ml of an ethanol solution of 0.05 mol of purified benzohydroxamic acid at 25° C. for 20 hours. The resulting solution was then filtered. The filtrate was then measured for absorbance. From Bm of the tape, thickness of magnetic layer and σs of the magnetic material, the weight of ferromagnetic metal in the sample was calculated. The amount of iron complex produced on the magnetic recording medium per unit area corresponding to 1 g of ferromagnetic metal powder in the tape was calculated from the absorbance on the calibration curve.

TABLE 5

| Magnetic recording medium | Upper ferromagnetic metal powder | Lower magnetic powder | Magnetic characteristics Hc(Oe)/SQ/Bm(G)/SFD | Init. abrasion coefficient | Abrasion coefficient after stored | Surface roughness (nm) | Output (dB) | S/N (dB) | Produced amount of iron complex (ppm/g) |
|---|---|---|---|---|---|---|---|---|---|
| Example 5-1 | Example 2-1 | TiO$_2$ | 2005/0.83/3955(0.43 | 0.24 | 0.33 | 2.5 | 4.5 | 4.4 | 3.1 |
| Example 5-2 | Example 2-2 | TiO$_2$ | 2250/0.84/4160/0.43 | 0.25 | 0.33 | 2.4 | 4.7 | 4.9 | 2.0 |
| Example 5-3 | Example 2-3 | TiO$_2$ | 2400/0.85/4180/0.43 | 0.26 | 0.35 | 2.5 | 4.9 | 4.8 | 1.7 |
| Example 5-4 | Example 2-4 | TiO$_2$ | 2470/0.84/4270/0.44 | 0.24 | 0.34 | 2.5 | 5.1 | 5.0 | 1.5 |
| Comparative Example 5-1 | Comparative Example 2-1 | TiO$_2$ | 1945/0.82/3750/0.45 | 0.26 | 0.73 | 2.6 | 3.5 | 3.6 | 7.2 |
| Example 5-5 | Example 2-3 | Example 3-1 | 2410/0.84/4170/0.43 | 0.25 | 0.37 | 2.3 | 5.1 | 5.1 | 2.3 |
| Example 5-6 | Example 2-3 | Example 3-2 | 2405/0.84/4150/0.43 | 0.25 | 0.36 | 2.2 | 5.1 | 5.0 | 2.2 |
| Example 5-7 | Example 2-3 | Example 3-3 | 2410/0.85/4185/0.43 | 0.25 | 0.36 | 2.2 | 5.2 | 5.2 | 2.0 |
| Example 5-8 | Example 2-3 | Example 3-4 | 2405/0.84/4100/0.43 | 0.24 | 0.35 | 2.3 | 5.1 | 4.9 | 2.5 |
| Example 5-9 | Example 2-3 | Example 3-5 | 2410/0.83/4150/0.45 | 0.26 | 0.36 | 2.4 | 4.8 | 4.9 | 2.7 |
| Example 5-10 | Example 2-3 | Example 3-6 | 2400/0.84/4100/0.44 | 0.23 | 0.37 | 2.3 | 5.0 | 5.1 | 3.1 |
| Comparative Example 5-2 | Example 2-3 | Comparative Example 3-1 | 2405/0.83/3950/0.45 | 0.25 | 0.85 | 2.5 | 4.8 | 4.9 | 6.5 |
| Example 5-11 | Example 2-1 | Example 3-3 | 2015/0.84/4000/0.43 | 0.26 | 0.34 | 2.3 | 4.6 | 4.5 | 3.2 |
| Comparative Example 5-3 | Example 2-1 | Comparative Example 3-1 | 2010/0.84/3990/0.44 | 0.25 | 0.88 | 2.4 | 4.4 | 4.5 | 6.9 |
| Comparative Example 5-4 | Comparative Example 2-1 | Example 3-3 | 1950/0.83/3740/0.45 | 0.25 | 0.90 | 2.5 | 3.8 | 3.7 | 8.2 |
| Comparative Example 5-5 | Comparative Example 2-1 | Comparative Example 3-1 | 1940/0.83/3650/0.45 | 0.26 | 0.95 | 2.5 | 3.6 | 3.6 | 8.5 |

Table 5 shows that the samples comprising titanium oxide incorporated in the lower layer tend to produce an iron complex on the tape in a less amount as compared with the samples comprising iron oxide incorporated in the lower layer. The produced amount of iron complex in the samples comprising iron oxide incorporated in the lower layer can be attributed to the content of ferromagnetic metal powder in the upper layer and iron oxide in the lower layer. In the case where iron oxide is incorporated in the lower layer, the more the amount of iron complex produced in the raw material is, the more is the amount of iron complex produced on the tape. The comparative samples which produce iron complex on the tape in an amount of not less than 6.0 ppm/g exhibit a higher friction coefficient as compared with the samples according to the present invention after stored, demonstrating that they have deteriorated electromagnetic characteristics.

In accordance with the present invention, an easy quality control can be made over magnetic recording media by measuring a magnetic recording medium comprising at least a ferromagnetic metal powder incorporated in a magnetic layer as a specimen for the produced amount of a complex of iron with benzohydroxamic acid or by measuring the amount of such an iron complex in the raw ferromagnetic metal powder and/or non-magnetic powder. Further, the produced amount of iron complex can be controlled to not more than a predetermined value to make stable provision of a magnetic recording medium which can be stored under high temperature and humidity conditions and exhibits good electromagnetic characteristics.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having thereon at least one magnetic layer comprising a binder and a ferromagnetic metal powder mainly composed of iron, wherein the amount of iron present is such that an amount of a complex formed by the reaction of the iron with benzohydroxamic acid is from 0 to 6.0 ppm/g.

2. The magnetic recording medium as in claim 1, wherein said ferromagnetic metal powder contained in said magnetic layer contains an amount of iron such that an amount of a complex is formed by the reaction of the iron with benzohydroxamic acid is from 0 to 10 ppm/g.

3. The magnetic recording medium as in claim 1, wherein said ferromagnetic metal powder contained in said magnetic layer has a water-soluble sodium salt content of from 0 to 100 ppm/g and a total water-soluble alkaline earth metal salt of from 0 to 50 ppm/g.

4. The magnetic recording medium as in claim 1, wherein said ferromagnetic metal powder contained in said magnetic layer is a ferromagnetic metal powder containing cobalt or nickel.

5. The magnetic recording medium as in claim 1, wherein said ferromagnetic metal powder contained in said magnetic layer comprises at least aluminum as a sintering inhibitor.

6. The magnetic recording medium as in claim 1, wherein said ferromagnetic metal powder has a long axis length of from 0.04 to 0.15 μm and an acicular ratio of from 4 to 10.

7. The magnetic recording medium as in claim 1, wherein said binder contains at least one polar group selected from the group consisting of COOM, $SO_3M$, $OSO_3M$, $P=O(OM)_2$, $O-P=(OM)_2$ wherein M is a hydrogen atom or alkaline metal base, OH, $NR_2$, $N^+R_3$ wherein R is a hydrocarbon group, epoxy group, SH or CN.

8. The magnetic recording medium as in claim 5, wherein said ferromagnetic metal powder contained in said magnetic layer comprises aluminum and yttrium as a sintering inhibitor.

9. The magnetic recording medium as in claim 5, wherein said ferromagnetic metal powder contained in said magnetic layer comprises at least one selected from the group consisting of Al, Si, S, Ti, V, Cr, Cu, Y, Mo, Rh, Pd, Ag, Sn, Sb, Te, Ba, Sr, W, Au, Pb, Bi, La, Ce, Pr, Nd, Sm, P, Mn, Zn, B, Ca and Mg in addition to Fe.

10. A magnetic recording medium which comprises a non-magnetic support having thereon at least two layers comprising a non-magnetic layer comprising a non-magnetic powder comprising iron oxide and a binder provided on a non-magnetic support and a magnetic layer comprising a binder and a ferromagnetic metal powder mainly composed of iron provided on said non-magnetic layer, wherein the amount of iron present is such that an amount of a complex is formed by the reaction of the iron in the non-magnetic powder contained in said non-magnetic layer with benzohydroxamic acid is from 0 to 10 ppm/g and has a water-soluble sodium salt content of from 0 to 150 ppm/g and a total water-soluble alkaline earth metal salt content of from 0 to 50 ppm/g.

11. The magnetic recording medium as in claim 10, wherein said non-magnetic powder contained in said non-magnetic layer is an acicular $\alpha$-$Fe_2O_3$.

12. The magnetic recording medium as in claim 11, wherein said $\alpha$-$Fe_2O_3$ contains an aluminum compound and/or silicon compound.

13. The magnetic recording medium as in claim 11, wherein said $\alpha$-$Fe_2O_3$ is surface-treated with an aluminum compound and/or silicon compound.

14. The magnetic recording medium of claim 1 wherein the ferromagnetic metal powder further includes cobalt.

15. The magnetic recording medium of claim 14 wherein the ferromagnetic powder further includes aluminum.

16. The magnetic recording medium of claim 10 wherein the ferromagnetic metal powder further includes cobalt.

17. The magnetic recording medium of claim 16 wherein the ferromagnetic powder further includes aluminum.

* * * * *